United States Patent Office 3,647,891
Patented Mar. 7, 1972

3,647,891
METHYLOL-TERMINATED FLUOROCARBON POLYMERS
Basil L. Loudas, St. Paul, and David E. Rice, Woodbury, Minn., assignors to Minnesota Mining and Manufacturing Company, St. Paul, Minn.
No Drawing. Filed July 1, 1968, Ser. No. 741,299
Int. Cl. C07c 31/34
U.S. Cl. 260—633       4 Claims

ABSTRACT OF THE DISCLOSURE

Methylol-terminated fluorocarbon polymers having the general formula

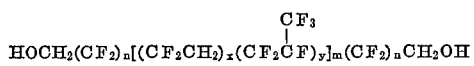

are prepared by reduction of the corresponding ester precursors, for example, with sodium borohydride. Said methylol-terminated polymers can be cured with polyisocyanate crosslinking agents and used as binders in solid rocket propellants.

---

Co-pending application S.N. 426,354 filed Jan. 19, 1965, now U.S. Pat. No. 3,438,953, incorporated herein by reference, discloses carboxyl ester-terminated fluorocarbon polymers which can be used to prepare the methylol-terminated fluorocarbon polymers of this invention.

This invention relates to methylol-terminated fluorocarbon polymers and their preparation by reduction of their ester precursors. In another aspect, it relates to cured products of said methylol-terminated polymers. In a further aspect, it relates to said cured products as binders for solid rocket propellants.

Certain hydroxy-terminated fluorocarbon compounds are known in the art, but we are not aware of any art that teaches methylol-terminated copolymers of vinylidene fluoride-perfluoropropene having perfluoromethylene groups in the alpha and beta positions. For example, E. T. McBee et al. in JACS 74, 444–446 (1952) disclose diols with the general formula

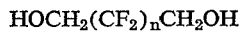

(where n is 1–4) prepared by reducing the respective diethyl ester using lithium aluminum hydride. U.S. Pats. 2,911,444 and 3,314,987 disclose the preparation of diols of the same general formula (where $n$ is 1 to 10) or diols of the general formula $HOCH_2(CF_2)_nCX_2(CF_2)_nCH_2OH$ (where $n$ is 1–7 and X is fluorine or a perfluoroalkyl) by the catalytic hydrogenation or reduction of ester precursors using copper-chromium oxide. The diols of this prior art have a completely fluorinated skeletal or backbone struture which limits their use to applications which do not require elasticity.

U.S. Pat. 3,147,314 discloses carboxy-terminated copolymers of vinylidene fluoride-hexafluoropropene with a backbone made up of a multiplicity of —CF₂CF₂—, —CH₂CF₂—, and —CF(CF₃)CF₂— units, the carboxy groups being atached to various types of backbone terminal portions which do not have exclusively CF₂ groups in the alpha and beta positions. In said co-pending application S.N. 426,354, carboxyl- or carboxyl ester-terminated copolymers of vinylidene fluoride-perfluoropropene are disclosed which do have CF₂ groups in the alpha and beta positions and when reduced produce the methylol-terminal fluorocarbon polymers of this invention.

Briefly, this invention provides in one aspect a novel class of methylol-terminated fluorocarbon polymers of the general formula

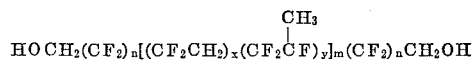

where $n$ is an integer of 2 to 10, preferably 2 to 4, $m$ is an integer of 5 to 500, preferably less than 100, and usually 15 to 20, and $x$ and $y$ are integers, the average ratio of $x$ to $y$ in said polymer being from 1:1 to 10:1, preferably less than 5:1 and usually between 1:1 and 1.9:1, the number average molecular weight (by vapor pressure osmometry) of such polymer generally being from 1,000 to 50,000, preferably from 1,000 to 10,000 and usually 1,000 to 5,000.

The structure shown in the above general Formula I is referred to as a polymer because of the multiplicity of repeating monomer units forming the skeletal or backbone structure and because they can be prepared by the copolymerization of vinylidene fluoride (VF₂) and hexafluoropropene (HFP), generally in a molar ratio VF₂/HFP from 90/10 to 50/50, preferably 75/25 to 55/45. These polymers are normally viscous liquids when they have molecular weights of 1,000 to 5,000, and at about 10,000 they become tacky solids. When cured or crosslinked, they form strong rubbery or elastomeric solid products, the fluorine-containing backbone imparting chemical resistance and thermal-stability.

In another aspect of this invention, said methylol-terminated fluorocarbon polymers are prepared by reduction of their ester precursors. The ester precursors which we prefer to use to make these diols are those disclosed in said co-pending application S.N. 426,354 where, in place of the methylol terminal groups (i.e., —CH₂OH) shown in general Formula I, the fluorocarbon skeletal structure is terminated with ester groups of the general formula —COOR, where R is preferably a lower alkyl having 1 to 8 carbon atoms or is an alpha, alpha dihydroperfluoroalkyl having 1 to 20 carbon atoms, preferably 1 to 8 carbon atoms, or R is an aryl having 6 to 12 carbon atoms. Ester precursors of this nature which are preferred as the starting materials in this invention are those having a number average molecular weight of about 1,000 to 5,000 and where the molar ratio of vinylidene fluoride/hexafluoropropene (i.e. the ratio of $x$:$y$) is about 75:25, to 55:45, and typically 65:35, and where $n$ is 4 and R is lower alkyl, especially methyl.

Although the ester precursors can be reduced to the diols by various reduction procedures, including catalytic hydrogenation in the presence of a copper-chromium oxide catalyst (see U.S. Pats. 2,911,444 and 3,314,987), we prefer to reduce the esters in the presence of a complex metal hydride, such as lithium aluminum hydride, LiAlH₄, or an alkali metal borohydride, such as sodium borohydride, NaBH₄, the reduction being carried out in an inert solvent such as an ether, e.g. tetrahydrofuran or dioxane. The amount of metal hydride used is at least an equivalent amount and preferably a one- or two-fold excess is used. The amount of solvent used is that sufficient to provide an easily-stirred solution, and generally this will be 1 to 10 times the weight of the ester.

We prefer to use the alkali metal borohydride rather than LiAlH₄ because of its greater solubility in the ether reaction solvent, and because its use results in less side reactions or by-products and consequently higher yield of diol, and further because the resulting reaction products are easier to work up or purify.

The reduction can be carried out at reflux temperatures. After the reduction is completed, the resulting reaction product, with the diol present in its salt form, can be cooled and treated with aqueous acid to precipitate the free diol product and destroy excess metal hydride. Any mineral acid can be used for this purpose, though we prefer to use hydrochloric acid, especially in dilute form (e.g., 10%). The precipitated product can be separated from the aqueous phase, for example, by decantation or filtration, washed with water, and dried, for example, under vacuum.

The methylol-terminated fluorocarbon polymers are soluble in ketones, such as acetone and methyl ethyl ketone in tetrahydrofuran, dimethylformamide, and in esters such as ethyl acetate, etc. As mentioned above, they have several useful properties. When cured with polyisocyanates, they are elastomeric materials having chemical resistance (e.g. resistance to the solvent effects of aviation fuel or other fuels, oils, and solvents). The cured products can be used as sealants for fuel tanks of aircraft. Shaped articles, such as O-rings, fuel conduits, etc., can be fabricated from the cured product. The diols can also be used as lubricants and hydraulic fluids, as well as plasticizers for other fluorocarbon polymers. They can also be used as intermediates in the preparation of cyanates and cyanurate polymers.

The cured polymers can be prepared by reacting the diols with polyisocyanates, such as toluene diisocyanate, such reaction resulting in the crosslinking of diol polymer molecules to form a rigid yet flexible system. Curing can be generally effected at from room temperature up to about 150° C., preferably from 70 to 100° C., for 1 to 3 days. Curing catalysts such as stannous octoate or dibutyltin dilaurate can be used to promote cure at lower temperatures. An advantage of this curing system is that it does not result in evolution of volatile materials.

In effecting the crosslinking or curing of the diol polymers, the polyisocyanate is used in at least a stoichiometric amount (based on the active hydrogen functionality of the diol polymer) and preferably up to 25–50% in excess of stoichiometric. In general, the more polyisocyanate used, the stronger the cured product but the lower the elongation. Another advantage of this system is that a high strength can be obtained from an essentially "liquid" material.

Representative polyisocyanates which can be used include:

benzene-1,3-diisocyanate;
benzene-1,4-diisocyanate;
hexamethylene diisocyanate;
toluene-2,4-diisocyanate;
toluene-2,5-diisocyanate;
diphenylmethane-4,4'-diisocyanate;
diphenyl-4,4'-diisocyanate;
diphenyl-3,3'-dimethyl-4,4'-diisocyanate;
2-chloropropane-1,3-diisocyanate;
diphenyl-3,3'-dimethoxy-4,4'-diisocyanate;
naphthalene-1,5-diisocyanate;
pentamethylene diisocyanate;
tetramethylene diisocyanate;
octamethylene diisocyanate;
dimethylene diisocyanate;
propylene-1,2-diisocyanate;
benzene-1,2,4-triisocyanate;
toluene-2,3-diisocyanate;
diphenyl-2,2'-diisocyanate;
naphthalene-2,7-diisocyanate;
naphthalene-1,8-diisocyanate;
toluene-2,4,6-triisocyanate;
benzene-1,3,5-triisocyanate;
benzene-1,2,3-triisocyanate;
cyclohexane triisocyanate;
toluene-2,3,4-triisocyanate;
polymethylene polyphenyl isocyanate;

and the like.

After homogeneous admixture is obtained of polymer and curing agent, the mixture is cured by any convenient procedure involving heating the mixture to a temperature typically in the range of from about 200 to 250° F. though lower temperatures can be employed if slower curing rates are to be used.

As those skilled in the art will appreciate, a sealant composition in general may have four or five components, such as a base polymer, a curing agent, a filler, a solvent, and sometimes additionally, resins to promote adhesion.

It is desirable to use as a base polymer one having sufficient fluidity so as not to require a solvent, as a solvent greatly complicates application of the sealant. The polymers of this invention do not require a solvent for use in sealant compositions.

Fillers are typically in the form of finely divided inert powders and used to reduce the cost of the sealant, improve mechanical properties, and control viscosity, but usually are not essential to a sealant composition. Typical filler concentrations range from about 5 to 100 parts per 100 parts of cured polymer. Common fillers are carbon black, silica, titanium dioxide, various clays, calcium carbonate, zirconium silicate, and the like.

For some highly specialized applications, non-cured sealant compositions are used, but in most applications sealant compositions require curing.

In general, to use an above described sealant composition one conventionally injects same into channels and voids as those familiar with caulking and similar operations will readily appreciate.

Another useful application for the methylol-terminated polymers of this invention are those applications requiring a high density castable material, such as binders for solid propellants used in rockets, missiles, flares, shells, etc. In using the diol polymers of this invention as binders in solid propellants, the general procedure employed will be to blend the diol polymers with the polyisocyanate, and then further blend the resulting mixture with the propellant oxidizer and other dry ingredients, such as powdered metal, and then heat the shaped mixture to form a cured propellant grain. Alternatively the binder can be blended with the oxidizer and then with the polyisocyanate, after which the composition can be further mixed, shaped, and heated to effect cure. Generally, the propellant oxidizer will be an inorganic oxidizing salt, such as the ammonium, alkali metal, and alkaline earth metal salts of nitric, perchloric, and chloric acids. Mixtures of these oxidizing salts can also be used. Ammonium nitrate and ammonium perchlorate are the preferred oxidizers for use in the solid propellant compositions of this invention. Other applicable oxidizers representatively include sodium nitrate, potassium perchlorate, lithium chlorate, calcium nitrate, barium perchlorate, strontium chlorate, and the like. In the preparation of the propellant compositions, the oxidizers are powdered to sizes generally in the range of from 1 to 300 microns average particle size, preferably in the range between 20 and 200 microns.

The amount of solid oxidizer and fuel (e.g., powdered aluminum) employed will usually be a major proportion of the total composition, and is generally in the range between 50 and 85 percent by weight of the total mixture. The binder in the propellant composition will usually be a minor proportion of the total composition, and is generally in the range between 15 and 50 percent by weight of the total mixture.

The propellant compositions of this invention can also contain various other conventional compounding ingredients, such as plasticizers, antioxidants, wetting agents, curing agents, metal oxides, reinforcing agents, powdered metals, and the like. The finished fuel-binder usually contains these other compounding ingredients, and the term will be used generically herein to cover the mixture of the fluorocarbon polymer with these other ingredients, unless otherwise noted.

The propellant composition of this invention can be formed into a grain having any desired shape or geometry, such as grains of the internal, external, and internal-external burning types, and geometries which provide progressive, neutral, or degressive modes of burning.

Further detail on the use of the diol polymers of this invention as propellant binders will be omitted in the interest of brevity, since the physical and manipulative steps in preparing solid propellants is well known in the art (see, for example, U.S. Pat. 3,050,423 the disclosure of which is incorporated herein by reference).

The following examples further illustrate the objects and advantages of this invention, but the various materials, and amounts thereof, and other details recited in these examples should not be construed to unduly limit this invention.

EXAMPLE 1

In this example, a diol having the formula

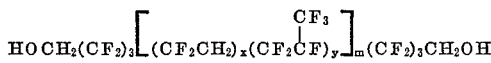

was produced by reducing an ester prepared in accordance with said co-pending application S.N. 426,354 having the formula

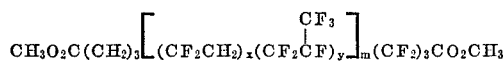

where the ratio $x:y$ is 55:45, said ester having a number average molecular weight of about 3,000.

In carrying out the reduction, 10 g. of said ester were dissolved in 75 cc. tetrahydrofuran and the resultant solution was added over a 4-hour period to a stirred mixture of 1.0 g. LiAlH$_4$ in 75 cc. tetrahydrofuran. Stirring was continued for an additional 1.5 hrs. and then 3 cc. ethyl acetate was added to destroy excess LiAlH$_4$. The resulting reaction product was poured into 1 l. of 10 vol. percent aqueous sulfuric acid, and the resultant mixture allowed to stand 16 hours. The precipitated diol polymer was heated with 100 cc. 10 vol. percent sulfuric acid, washed several times with water, and dried under vacuum, yielding 8.0 g. of amber-colored diol polymer product. Infrared analysis of the product showing the presence of —CH$_2$OH groups and the absence of ester groups.

EXAMPLE 2

A diol polymer product like that of Example 1 was prepared by reducing the same ester precursor with sodium borohydride. This reduction was carried out by dissolving 100 g. of said ester in 100 cc. tetrahydrofuran and refluxing the solution for 3 hrs. with 3.0 g. sodium borohydride. The reaction mixture was then poured into 2 l. of water containing 10 cc. concentrated hydrochloric acid. The precipitated polymer was removed from the reaction mixture and dried under vacuum for 24 hours at 70° C. to yield 95 g. of a clear diol product, infrared and nuclear magnetic resonance analysis showing the presence of —CH$_2$OH groups and the absence of ester groups.

EXAMPLE 3

In this example, a diol polymer of the formula

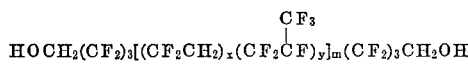

by reduction of an ester prepared as disclosed in said co-pending application Ser. No. 426,354 having the general formula

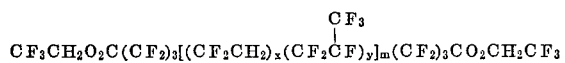

where the ratio $x:y$ was 65:35, said ester having a number average molecular weight of about 1500. In carrying out this reduction 70 g. of said ester were dissolved in 400 cc. of tetrahydrofuran and refluxed for 6 hrs. with 4.5 g. sodium borohydride. Most of the tetrahydrofuran solvent was distilled off of the reaction mixture and then 150 cc. xylene hexafluoride were added. The resulting mixture was then added to 800 ml. of ice water containing 25 cc. concentrated sulfuric acid. The organic layer was separated, dried over magnesium sulfate, and filtered. Solvent was removed from the filtrate, leaving 60 g. clear diol polymer having a syrupy consistency, infrared analysis of this product showing —CH$_2$OH groups and the absence of ester groups.

EXAMPLE 4

In this example, a number of samples of diol polymer were cured with various curing agents. The diol polymer had the formula:

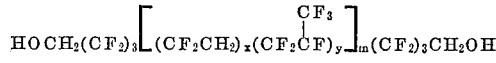

where the ratio $x:y$ was 65:35, the diol having a number average molecular weight of about 3,000. In each run, a 5 g. sample of the diol polymer was warmed to 50 to 70° C. and the particular curing agent used in the run then stirred into the warmed polymer. The mixture was then placed in an open mold made from polytetrafluoroethylene and the sample heated in an oven to effect cure. Physical properties of the resulting cured products were then determined, these properties and other details of the various runs being summarized in Table I.

The data of Table I show the desirable elastomeric properties which can be developed with the polyisocyanate cure system. The tensile strengths and elongations are excellent, particularly when considering the relatively low molecular weight starting material.

EXAMPLE 5

In this example, a diol polymer of the formula

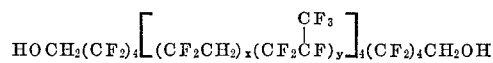

was prepared by reducing an ester of said co-pending application Ser. No. 426,354 having the general formula

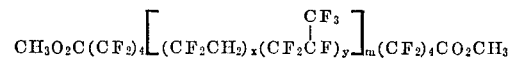

said ester having a ratio $x:y$ of 60:40 and a number average molecular weight of 2900. In carrying out this reduction, 25 g. of the ester were dissolved in 50 cc. tetrahydrofuran and the resultant solution added slowly to a stirred refluxing mixture of 1.5 g. sodium borohydride in 50 cc. tetrahydrofuran. After this addition, the mixture was further refluxed with stirring for 2 hrs. and then added to a solution consisting of 30 cc. tetrahydrofuran, 150 cc. water, and 15 cc. concentrated hydrochloric acid. The diol polymer was precipitated from this mixture by adding to the latter 2 l. water. The precipitate was filtered off and dried under vacuum to yield 25 g. of clear viscous diol polymer having an inherent viscosity of 0.049 in xylene hexafluoride. A 5 g. sample of this diol polymer was blended with 0.4 g. polymethylene polyphenyl isocyanate at 70° C. The mixture was then heated for 18 hrs. at 110° C. in an open mold. The resulting rubbery product was found to have a tensile strength of 1500 p.s.i. and an elongation at break of 280%.

TABLE I

| Run | Curing agent and amount | Cure | Tensile strength, p.s.i. | Elongation, percent | Percent set at break | Shore A2 hardness |
|---|---|---|---|---|---|---|
| A | Hexamethylene diisocyanate (0.3 g.) | {24 hrs. at 110° C / 24 hrs. at 130° C} | 680 | 400 | 6 | 57 |
| B | 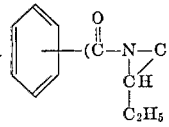 (0.6 g.) + zirconium acetyl acetonate (0.05 g.) | 72 hrs. at 110° C | 660 | 150 | 2 | 67 |
| C | Polymethylene polyphenyl isocyanate (0.3 g.) | 24 hrs. at 110° C | 1,000 | 270 | 13 | 62 |
| D | Polymethylene polyphenyl isocyanate (0.5 g.) | do | 1,365 | 300 | 0 | 68 |

EXAMPLE 6

A solid propellant mixture is made by blending 20 parts of the diol polymer of Example 2, 5 parts of polymethylene polyphenyl isocyanate, 55 parts ammonium perchlorate, and 20 parts powdered aluminum, these parts being parts by weight. The resultant viscous mixture is transferred to an open cylindrical mold and heated at 70° C. for 3 days, to form a propellant grain. The cured grain has the nature of a rubbery solid with good physical properties and burns smoothly and completely.

Various modifications and alterations of this invention will become apparent to those skilled in the art without departing from the scope and spirit of this invention, and it should be understood that this invention is not to be unduly limited to the illustrative embodiment set forth herein.

We claim:

1. Polymers of the formula:

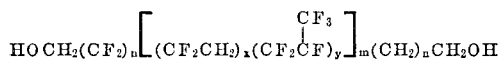

where $n$ is an integer of 2 to 10, $m$ is an integer of 5 to 500, and $x$ and $y$ are integers the ratio of which is 1:1 to 10:1, the number average molecular weight of said polymers being from 1000 to 50,000.

2. Polymers according to claim 1, wherein $n$ is 2 to 4, $m$ is 15 to 20, and $x:y$ is 1:1 to 1.9:1, the number average molecular weight of said polymers being from 1000 to 5000.

3. Polymers according to claim 2 wherein $n$ is 3.

4. Polymers according to claim 2 wherein $n$ is 4.

References Cited

UNITED STATES PATENTS

| | | | |
|---|---|---|---|
| 2,666,797 | 1/1954 | Husted et al. | 260—633 |
| 2,683,721 | 7/1954 | Schlesinger et al. | 260—633 XR |
| 2,824,897 | 2/1958 | Wujciak et al. | 260—633 |
| 3,051,744 | 8/1962 | Bowers | 260—633 XR |
| 3,069,401 | 12/1962 | Gallagher | 260—633 XR |
| 3,102,103 | 8/1963 | Ahlbrecht et al. | 260—633 XR |
| 3,293,306 | 12/1966 | Le Bleu et al. | 260—615 |
| 3,478,116 | 11/1969 | Smeltz | 260—633 |

FOREIGN PATENTS

| | | | |
|---|---|---|---|
| 132,212 | 10/1960 | U.S.S.R. | 260—633 |

HOWARD T. MARS, Primary Examiner

U.S. Cl. X.R.

149—19, 40; 252—54, 77; 260—77.5